United States Patent
Bernardi et al.

(10) Patent No.: US 7,295,345 B2
(45) Date of Patent: Nov. 13, 2007

(54) METHOD FOR CALIBRATION INDEPENDENT DEFECT CORRECTION IN AN IMAGING SYSTEM

(75) Inventors: Bryan D. Bernardi, Webster, NY (US); William M. Barnick, Fairport, NY (US); Damian M. Muniz, Churchville, NY (US); Dale L. Tucker, Byron, NY (US)

(73) Assignee: Eastman Kodak Company, Rochester, NY (US)

( * ) Notice: Subject to any disclaimer, the term of this patent is extended or adjusted under 35 U.S.C. 154(b) by 1023 days.

(21) Appl. No.: 10/425,248

(22) Filed: Apr. 29, 2003

(65) Prior Publication Data
US 2004/0218223 A1    Nov. 4, 2004

(51) Int. Cl.
*H04N 1/40* (2006.01)

(52) U.S. Cl. .......................... 358/2.1; 358/504

(58) Field of Classification Search ............... 358/2.1, 358/1.9, 504, 406, 523–524, 1.16–1.17
See application file for complete search history.

(56) References Cited

FOREIGN PATENT DOCUMENTS

EP    1 134 698 A1    9/2001
WO    WO 9967743 A1 *    12/1999

* cited by examiner

*Primary Examiner*—Thomas D. Lee
*Assistant Examiner*—Stephen Brinich
(74) *Attorney, Agent, or Firm*—Nelson Adrian Blish

(57) ABSTRACT

A method for applying defect correction and calibration to image data (100) in an imaging system using an area spatial light modulator (146), where a tone correction LUT (148') is applied to the image data (100) to apply calibration correction before applying defect correction using a defect map (122) with an accompanying gain table (124). The tone correction LUT (148) is then applied to the image data in the image modulation assembly (140).

16 Claims, 7 Drawing Sheets

METHOD FOR CALIBRATION INDEPENDENT DEFECT CORRECTION IN AN IMAGING SYSTEM

CROSS REFERENCE TO RELATED APPLICATIONS

Reference is made to commonly-assigned copending U.S. patent application Ser. No. 09/606,891, filed Jun. 29, 2000, entitled A METHOD AND APPARATUS FOR CORRECTING DEFECTS IN A SPATIAL LIGHT MODULATOR BASED PRINTING SYSTEM, by William M. Barnick; U.S. patent application Ser. No. 09/712,641, filed Nov. 14, 2000, entitled METHOD OF COMBINING ACQUIRED DIGITAL DATA TO CONSTRUCT A COMPOSITE IMAGE, by Rosario et al.; and U.S. patent application Ser. No. 10/360,030, filed Feb. 7, 2003, entitled A METHOD FOR DETERMINING AN OPTIMUM GAIN RESPONSE IN A SPATIAL FREQUENCY RESPONSE CORRECTION FOR A PROJECTION SYSTEM, by Bernardi et al., the disclosures of which are incorporated herein.

FIELD OF THE INVENTION

The present invention relates to imaging using an area spatial light modulator and more particularly relates to a method for defect correction for an area spatial light modulator that is substantially independent of device calibration.

BACKGROUND OF THE INVENTION

While two-dimensional area spatial light modulators such as transmissive and reflective LCDs offer significant promise for use as image forming devices in high-resolution printers, there are some inherent drawbacks to using these devices. Among these drawbacks is the necessity for employing some form of defect correction due to imperfect manufacturing processes. High-frequency defects occur, for example, as a result of surface brushing needed for providing an alignment bias to the liquid crystal structures. Low-frequency defects occur, for example, due to other irregularities across the surface of the area spatial light modulator.

One method of compensation for defects of this type uses a defect map along with an accompanying gain table. For example, commonly assigned U.S. patent application Ser. No. 10/360,030, filed Feb. 7, 2003 entitled A METHOD FOR DETERMINING AN OPTIMUM GAIN RESPONSE IN A SPATIAL FREQUENCY RESPONSE CORRECTION FOR A PROJECTION SYSTEM, by Bernardi et al. discloses a method for obtaining a defect map and accompanying gain table that can be applied to a printing system. The defect map/gain table combination developed using this method can be used to effectively compensate for various types of both low- and high-frequency defects peculiar to an individual LCD or other area spatial light modulator, over the range of achievable light intensity levels.

One problem with existing defect correction techniques relates to a dependence on proper device calibration. Particularly in printing applications using an area spatial light modulator, frequent recalibration of the spatial light modulator is necessary, for example to accommodate changes in device performance or to compensate for batch-to-batch differences in the response of photosensitive media. However, changes in calibration can be accompanied by unwanted changes in defect compensation. Thus, while defect correction cannot be made completely independent of device calibration, it would be advantageous to make defect correction as independent of calibration as possible, so that calibration changes have negligible effect on device defect correction.

Some of the problems that complicate obtaining effective defect correction from one calibration to the next are due to inherent limitations of printing apparatus hardware. For example, the spatial light modulator, although itself capable of imaging at resolutions of 10-bits or higher, may be limited by its support components to image data having a bit depth, also termed a "bit space", of no more than 8-bits. Thus, imaging data and look-up tables (LUTs) may be constrained to 8-bit values. However, calibration algorithms can be more effective using a higher bit space, such as using 10-bit or 12-bit values. Because of inherent device limitations, values computed in a higher bit space often need to be subsequently translated to a lower bit space for support components of the spatial light modulator. As a result of this need to scale between higher and lower bit spaces, some image contouring and related effects can degrade imaging performance following calibration. Added defect correction can further degrade uniformity over some areas of the spatial light modulator, causing visible image aberrations due to overcorrection of component defects. Over-correction of this type could cause streaking in a printed image, for example.

Thus, it can be seen that there is a need for an image processing path that minimizes potential negative effects of calibration on both low- and high-frequency defect correction and provides a high degree of imaging uniformity, making defect correction substantially independent of calibration.

SUMMARY OF THE INVENTION

It is an object of the present invention to provide defect correction that is substantially independent of device calibration. With this object in mind, the present invention provides a method for applying defect correction and calibration to an image data value for a pixel in an imaging system using an area spatial light modulator that accepts image data values having a first bit depth, the method comprising:

(a) providing the image data value to a first tone correction LUT to obtain a corresponding tone corrected data value, the tone corrected data value having the first bit depth;

(b) applying, to the tone corrected data value, a defect compensating value from a defect map generated for the area spatial light modulator and a gain value associated with the defect compensating value, forming thereby a first tone and defect corrected image data value having the first bit depth;

(c) applying an inverse tone correction LUT to convert the first tone and defect corrected image data value to a second tone and defect corrected image data value having a second bit depth, the second bit depth being lower than the first bit depth; and (d) providing the second tone and defect corrected image data value to a second tone correction LUT to obtain a conditioned input data value for the area spatial light modulator, the conditioned input data value having the first bit depth.

It is a feature of the present invention that, before defect correction is applied, image data is processed through a copy of the tone correction LUT developed for calibration.

It is an advantage of the present invention that it provides a method for applying defect correction that is substantially independent of calibration. Using the method of the present invention, defect correction is performed after calibration compensation is applied.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
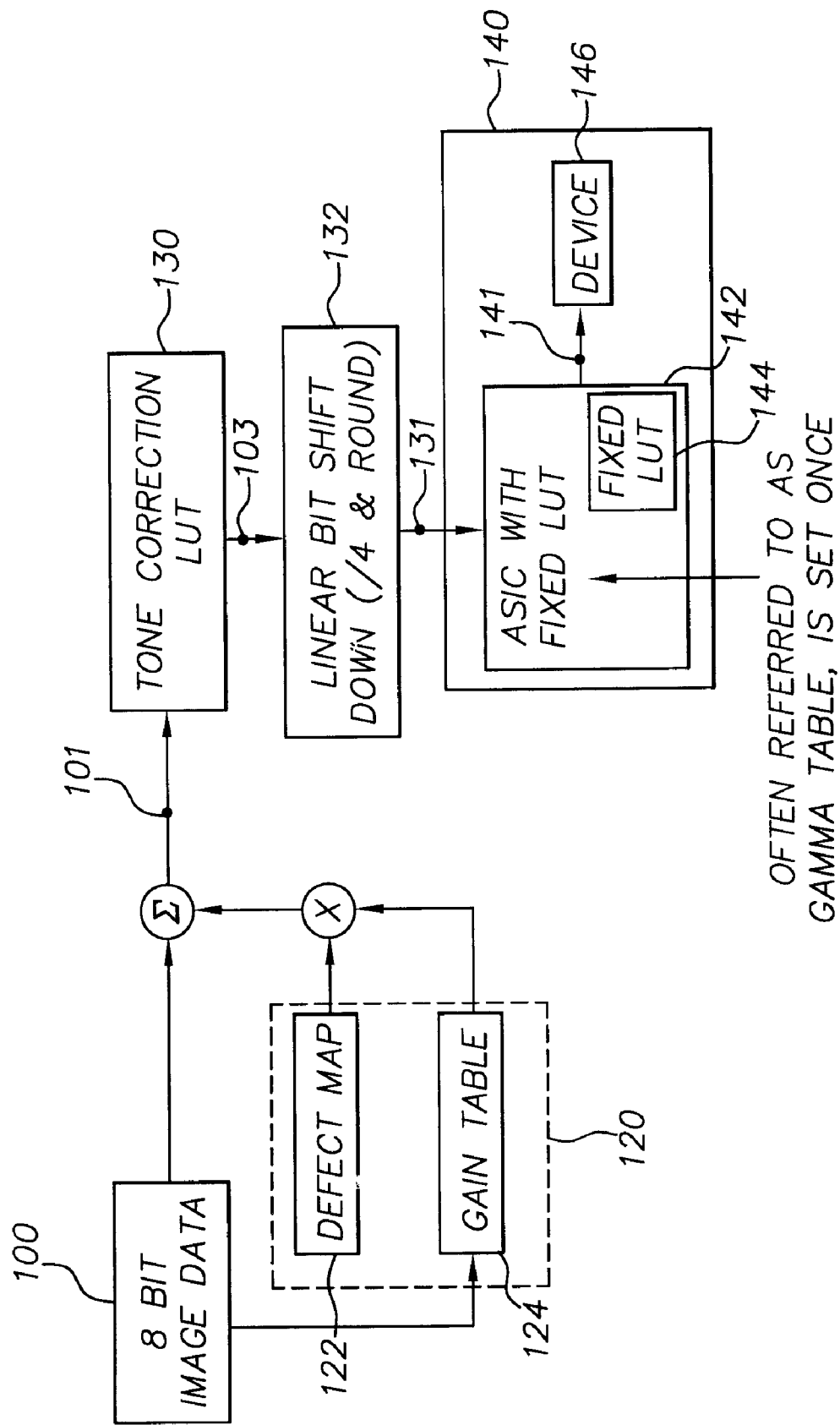
FIG. 1 is a flow diagram showing processing of image data with defect correction dependent upon calibration.

Referring to FIG. 1, there is shown an imaging path providing both defect correction and device calibration for a printing application. Image data 100 is conditioned by a defect correction processing block 120, developed as disclosed in commonly-assigned copending U.S. patent application Ser. No. 09/606,891, filed Jun. 29, 2000, entitled A METHOD AND APPARATUS FOR CORRECTING DEFECTS IN A SPATIAL LIGHT MODULATOR BASED PRINTING SYSTEM, by William M. Bamick; U.S. patent application Ser. No. 09/712,641, filed Nov. 14, 2000, entitled METHOD OF COMBINING ACQUIRED DIGITAL DATA TO CONSTRUCT A COMPOSITE IMAGE, by Rosario et al.; and U.S. patent application Ser. No. 10/360,030, filed Feb. 7, 2003, entitled A METHOD FOR DETERMINING AN OPTIMUM GAIN RESPONSE IN A SPATIAL FREQUENCY RESPONSE FOR A PROJECTION SYSTEM, by Bernardi et al. Defect correction processing block 120 comprises a defect map 122 and a corresponding gain table 124. Defect-corrected image data 101 then goes to a tone correction LUT 130 where calibration processing is applied. As noted in the background, calibration algorithms generate tone correction LUT 130 in a higher bit space than that of the original image data. A linear bit shift/down register 132 then divides the resulting 10- or 12-bit data back down to 8-bits to provide defect-corrected and calibration-corrected image data 131. An image modulation assembly 140 comprises an ASIC 142 with a fixed LUT 144 that further conditions defect-corrected and calibration-corrected image data 131 and provides modulated image data 141 to a spatial light modulator 146 for imaging.

The imaging path of FIG. 1 provides modulated image data 141 with both defect correction and calibration compensation to some degree, conditioning the original image data 100 through the sequence of processing steps shown. However, the procedural sequence of FIG. 1 has drawbacks for maintaining aberration-free imaging over the lifetime of an imaging apparatus, since defect correction provided in defect correction processing block 120 is highly dependent on calibration. Re-calibration of spatial light modulator 146 can adversely impact the defect correction that is applied, resulting in imaging aberrations.

As the imaging path of FIG. 1 shows, it is useful to fix some points, such as with fixed LUT 144, and to allow other data to be shifted over time. However, the overall sequence of FIG. 1 can be less than satisfactory for providing adequate defect correction relative to calibration.

Figure 2:
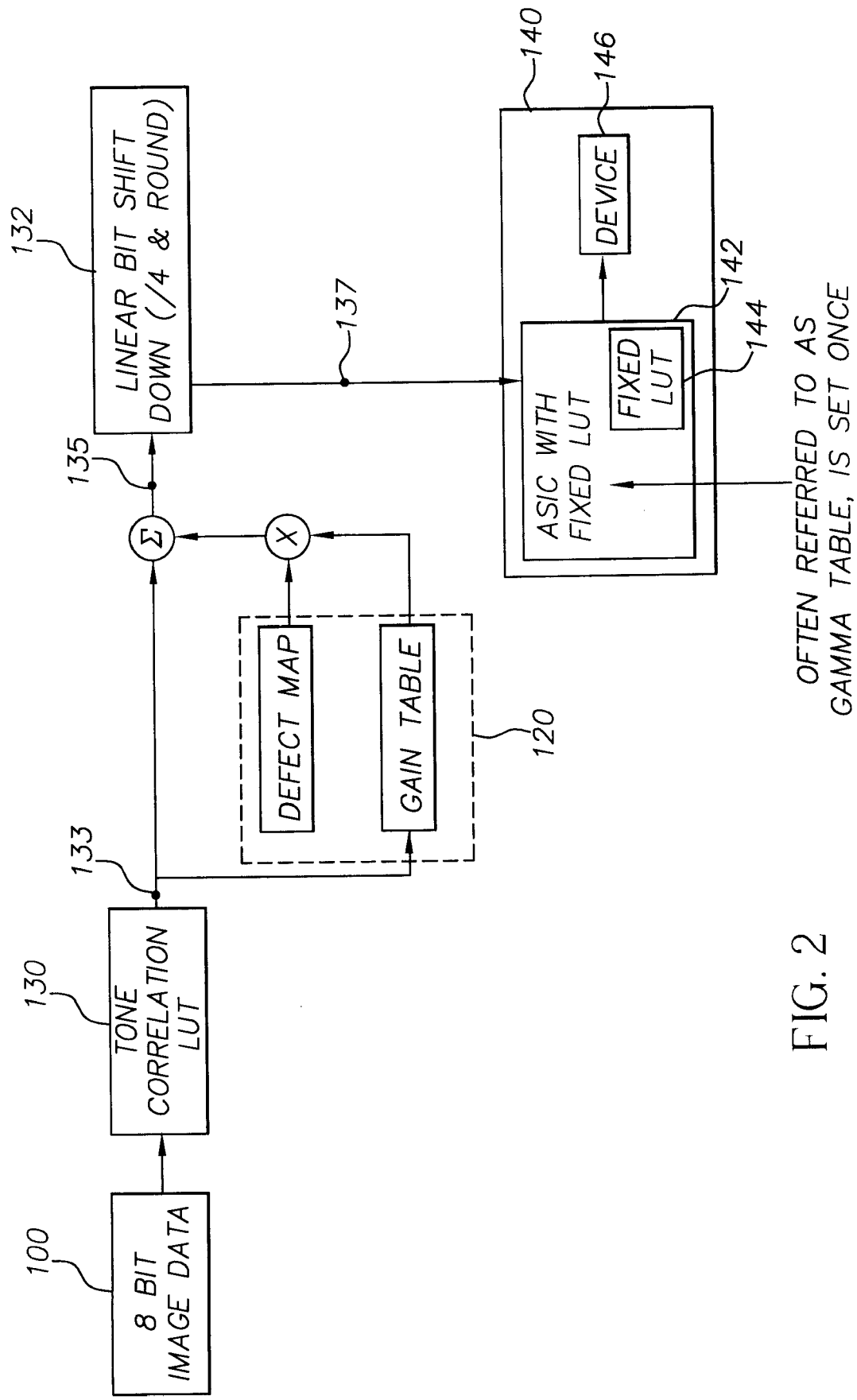
FIG. 2 is a flow diagram showing processing of image data where defect correction is applied in a color space having a higher bit depth resolution than that of the incoming image data.

Referring to FIG. 2, there is shown an improved method for providing both defect correction and calibration, with defect correction applied in the higher bit space used for calibration. Here, image data 100 is first conditioned by tone correction LUT 130 to provide calibration-corrected image data 133. Tone correction LUT 130 operates in a higher bit space than that of incoming image data 100, so that calibration-corrected image data 133 is itself in a higher bit space. Calibration-corrected image data 133 is then conditioned by defect correction processing block 120 to provide corrected image data 135 at a higher bit space than that of spatial light modulator 146. Linear bit shift/down register 132 then divides corrected image data 135 back to a suitable bit-space resolution for image modulation assembly 140, which is configured as was described with reference to FIG. 1.

Similar to the sequence of FIG. 1, the image processing sequence of FIG. 2 also provides both defect correction and calibration compensation to image data 100. Unlike the image processing sequence of FIG. 1, however, defect correction processing block 120 operates in the higher bit space used for calibration. The sequence of FIG. 2, then, provides some degree of independence of defect correction from calibration. However, empirical results clearly show that the method shown in FIG. 2 is often unsatisfactory, allowing quantization or contouring aberrations in the output image. Simply performing defect correction in the bit space used for calibration, then, does not provide an acceptable solution and can even degrade image quality.

Figure 3:
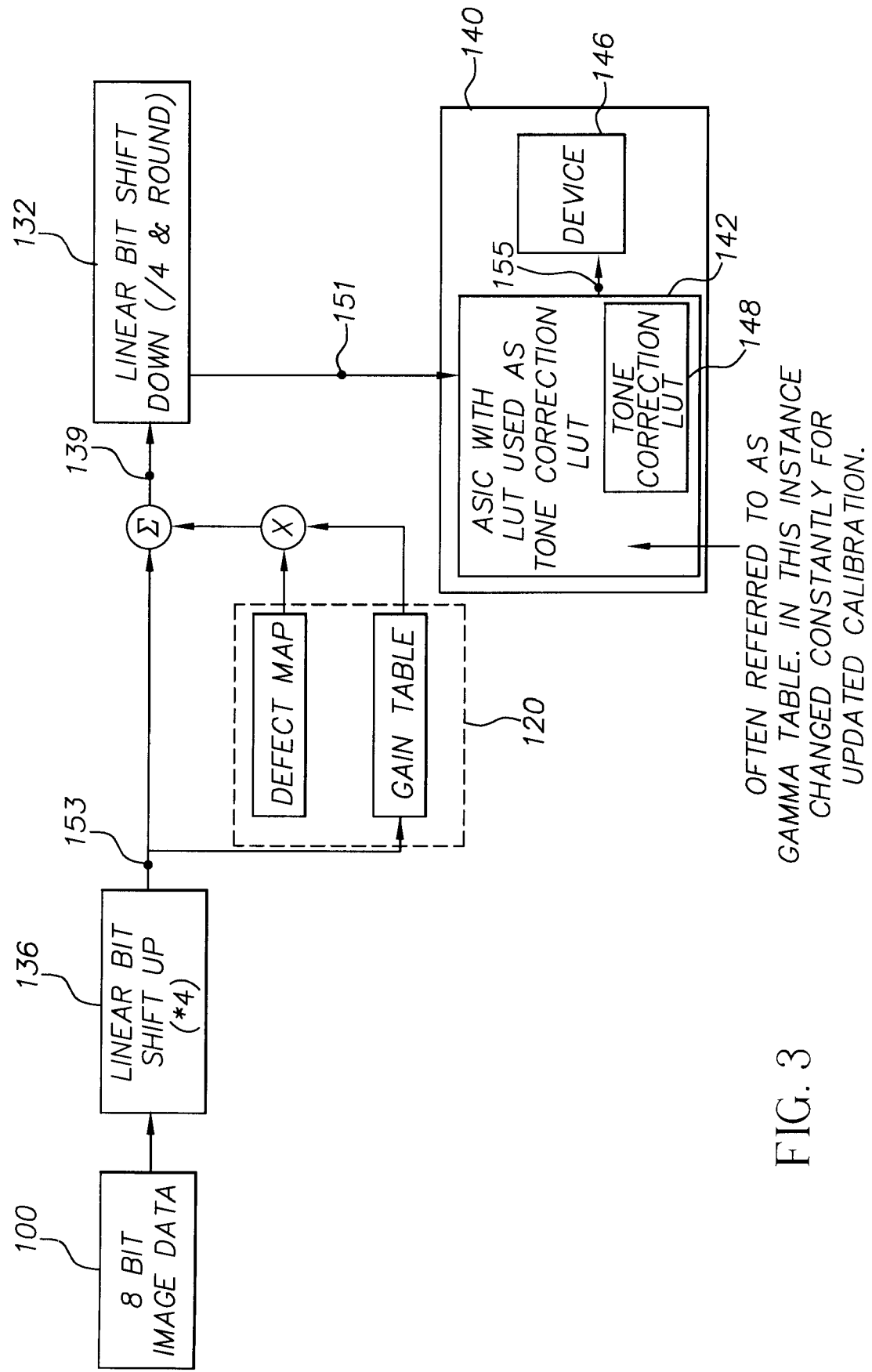
FIG. 3 is a flow diagram showing processing of image data where image data is first shifted to a higher bit space before defect correction is applied.

Referring to FIG. 3, there is shown another improved method in which defect correction is applied in the higher calibration bit space. Unlike the methods of FIGS. 1 and 2, the sequence of FIG. 3 maintains a re-writable tone correction LUT 148 in ASIC 142 for calibration adjustment. In the method of FIG. 3, image data 100 is first shifted to the higher bit space used for calibration in a linear bit shift/up register 136, to provide shifted image data 153. Shifted image data 153 is then conditioned by defect correction processing block 120 to provide shifted corrected image data 139. Linear bit shift/down register 132 then divides the data to provide reduced bit space corrected image data 151 to image modulation assembly 140. Within image modulation assembly 140, calibration is effected using tone correction LUT 148 in ASIC 142 that is rewritten with each device calibration. Resulting defect corrected and calibrated image data 155 is then input to spatial light modulator 146.

It is instructive to note that the sequence of FIG. 3 provides calibration following defect correction processing. Thus, even though defect correction is applied in the higher bit space used for calibration algorithms, the sequence of FIG. 3 has some of the inherent problems described with reference to FIG. 1, with defect correction dependent, in large part, on calibration.

Thus, it can be seen that different arrangements of the sequence of image data processing, as are shown in FIGS. 1, 2, and 3, provide varying degrees of independence of defect correction from calibration. However, none of the sequences of FIGS. 1-3 provide a sufficient degree of independence of defect correction, so that subsequent re-calibration procedures do not negatively impact defect correction. Instead, re-calibration procedures may counteract defect correction or result in unwanted image contouring and other quantization-related imaging anomalies.

Figure 4:
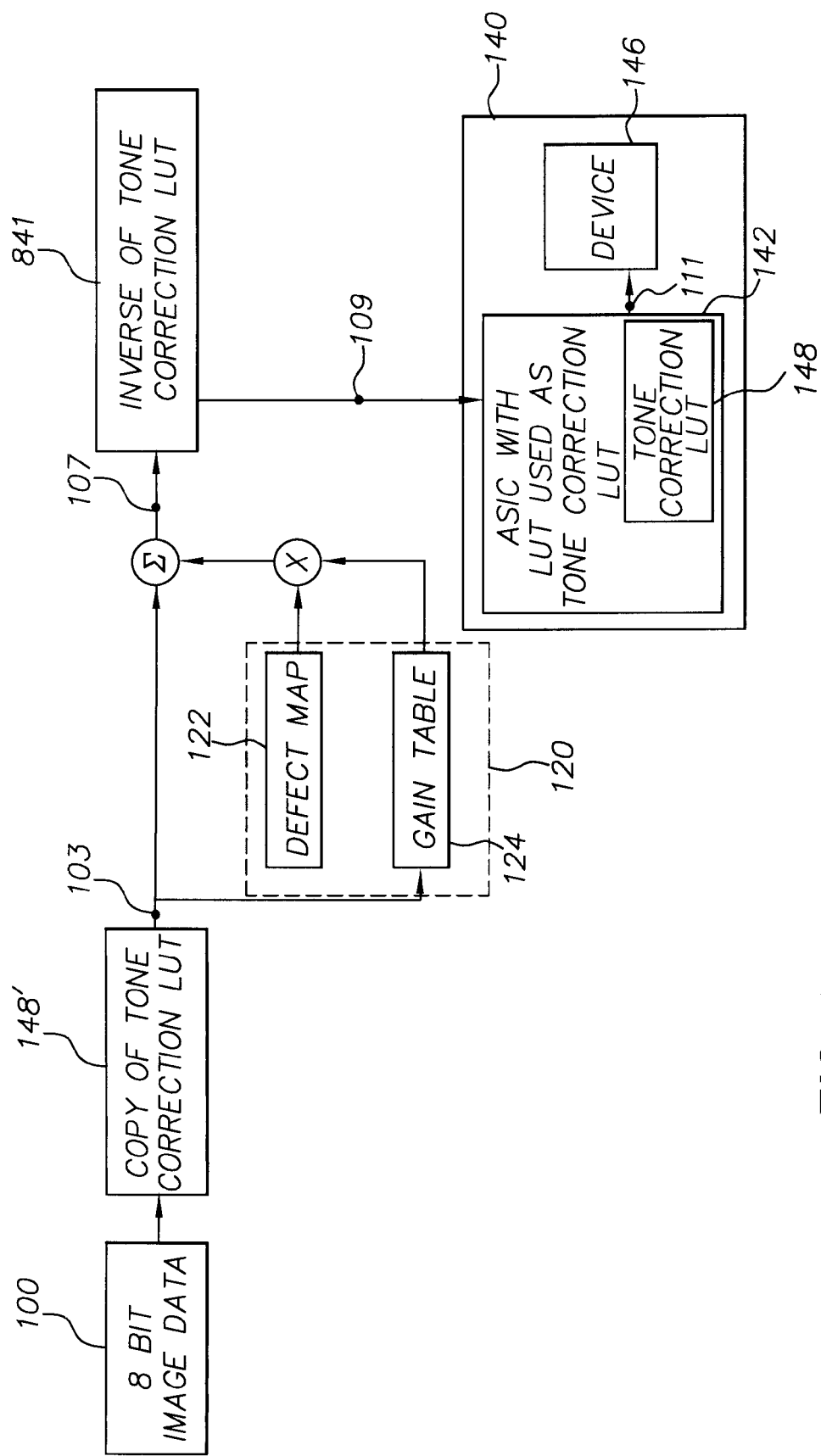
FIG. 4 is a flow diagram showing processing of image data according to the present invention, where defect correction is substantially independent of calibration.

Referring now to FIG. 4, there is shown an embodiment of the present invention that, in contrast to the arrangements of FIGS. 1-3, provides substantial independence of defect correction from device calibration. As a brief overview of the sequence of FIG. 4, input image data 100 is first processed using a copy 148' of tone correction LUT 148, which applies calibration adjustment to image data 100, thereby converting image data 100 to tone corrected image data 103, at the higher bit space used for calibration processing. Tone corrected image data 103 is then conditioned by defect correction processing block 120 to provide tone and defect corrected image data 107 for each image pixel. An inverse tone correction processing LUT 841 then converts tone and defect corrected image data 107 to ASIC input data 109, in the lower-resolution bit space used for input to image modulation assembly 140, which is typically 8-bits. Within image modulation assembly 140, processing through tone correction LUT 148 then provides conditioned input data 111, in the higher calibration bit space, which is input to spatial light modulator 146 for forming an image.

Referring again to the processing sequence shown in FIG. 4 with special emphasis on the data transformations, the 8-bit image data 100 is first transformed into tone corrected image data 103, thereby converting the data value for input pixels from the input 0-255 range to a range having a higher bit value, yielding a corresponding value in an expanded 0-1215 range in a preferred embodiment. The tone corrected image data 103 value may be inverted from the original value so that, for example, a 0 input data value corresponds to a 1215 tone corrected image data 103 value. This first transformation through copy 148' of tone correction LUT 148 maps each initial 0-255 image data value to a corresponding 0-1215 tone corrected image data 103 value, in the bit space of calibrated values. Next, within this same bit space of calibrated values, defect correction is applied. It is instructive to note that the defect correction applied in defect correction processing block 120 is applied as needed by each individual pixel of spatial light modulator 146. For most pixels, no defect correction need be applied. For those pixels needing defect correction, the defect correction value typically provides an offset to the corresponding tone corrected image data 103 value. For correction of a low-frequency defect, in the range used in a preferred embodiment, an offset value is typically in the +/−80 range. For correction of a high-frequency defect, an offset value is typically in the +/−30 range. The average value of the resulting defect corrected image data 107 for all image pixels closely approximates the average value for all tone corrected image data 103 value provided from copy of tone correction LUT 148'. However, individual pixels in defect corrected image data 107 are provided with some added or subtracted offset value as compensation for pixel defects using this scheme.

Continuing with the sequence of FIG. 4, inverse tone correction processing LUT 841 provides a mapping of defect corrected image data 107 back to the reduced bit space of ASIC input data 109, while preserving calibration. To provide this inverse mapping so that imaging anomalies are minimized, an inverse LUT is used. The inverse LUT can be curve-fit or otherwise computed, using data mapping techniques familiar to those in the calibration imaging arts. Resulting ASIC input data 109 can then be provided to tone correction LUT 148 in ASIC 142 to produce conditioned input data 111 for spatial light modulator 146. With this processing sequence, then, conditioned input data 111, in the higher bit space of spatial light modulator 146, preserves the calibration results provided in tone corrected image data 103, minimizing the likelihood of contouring or other quantization errors in the image produced using spatial light modulator 146.

EXAMPLES OF INPUT DATA PROCESSING

In order to understand how the data processing sequence of FIG. 4 operates to provide defect correction that is relatively independent of device calibration, it is instructive to follow this sequence with a few examples.

Example One

As a first example of the processing provided using the sequence of FIG. 4, using the 0-255 and 0-1215 ranges of the embodiment noted hereinabove, consider the operation of this sequence when tone correction LUT 148 and the identical copy of tone correction LUT 148' are linear. In such a case, effectively no calibration is applied to image data 100, only defect correction would be applied. Consider an input image data 100 value of 131. At copy of tone correction LUT 148', this value is converted to an integer value in the 0-1215 range and is inverted. For this case, where copy of tone correction LUT 148' is linear, the resulting tone corrected image data 103 value can be computed as follows:

$$1215-(1215/255)*131=591$$

At defect correction processing block 120, a particular pixel has a defect correction offset of +20. This yields a tone and defect corrected image data 107 value, for this pixel, of:

$$591+20=611$$

Inverse tone correction processing LUT 841 then converts tone and defect corrected image data 107 back down to the 0-255 range of spatial light modulator 146, by inverting the linear relationship of tone correction LUT 148, using:

$$255-(255/1215)*611=127$$

Thus, in this first example, the calibrated and tone corrected value that serves as ASIC input data 109 is 127 for this pixel, given an input image data 100 value of 131. This same type of calculation and mapping sequence would then be applied to the input image data 100 value for each pixel in the image to be printed.

At tone correction LUT 148 then, a final transform is performed to obtain conditioned input data 111, using:

1215−(1215/255)*127=610

This conditioned input data 111 value of 610 is then provided to spatial light modulator 146 as the data used for imaging.

Example Two

As a second example, it is instructive to consider the case where when tone correction LUT 148 and the identical copy of tone correction LUT 148' are non-linear. In this more complex but more realistic case, tone correction LUT 148 adjusts for device calibration by mapping each image data 100 value to a calibrated value. Again, consider an input image data 100 value of 131. At copy of tone correction LUT 148', this value is converted to an integer value in the 0-1215 range and is inverted. For this example, where copy of tone correction LUT 148' is non-linear, the resulting tone corrected image data 103 value from this LUT mapping is 600. At defect correction processing block 120, this particular pixel again has a defect correction offset of +20. This yields a tone and defect corrected image data 107 value, for this pixel, of:

600+20=620

Inverse tone correction processing LUT 841 then converts tone and defect corrected image data 107 back down to the 0-255 range of spatial light modulator 146, by an inverse mapping that correlates value 620 to 125. Thus, in this second example, the calibrated and tone corrected value that serves as ASIC input data 109 is 125 for this pixel, given an input image data 100 value of 131. This same type of calculation and mapping sequence would then be applied to the input image data 100 value for each pixel in the image to be printed.

It is important to emphasize that the sequence shown in FIG. 4 preserves calibration for pixels that need no defect correction as well as for pixels that require defect correction. That is, in the case where defect correction processing block 120 adds no offset (that is, adds zero) to the tone corrected image data 103 value for a pixel, the transformation sequence performed through processing by copy of tone correction LUT 148', inverse tone correction processing LUT 841, and tone correction LUT 148, acts to preserve the integrity of the calibration that has been performed. As a result, for any pixel requiring no defect correction, the intermediate tone corrected image data 103 value output from copy of tone correction LUT 148' is substantially equal to the conditioned input data 111 value that is provided as input to spatial light modulator 146, within some small tolerance for mapping error. Similarly, for such a value requiring no defect correction, the image data 100 value is substantially equal to the ASIC input data 109 value, again, within some small tolerance for mapping error.

In order for calibration to be preserved in this way, the following relationship rules must be followed:
  (a) tone correction LUT 148 and copy of tone correction LUT 148' are identical; any change to tone correction LUT 148 due to calibration is faithfully made to copy of tone correction LUT 148'; and
  (b) inverse tone correction processing LUT 841 must be an inverse of tone correction LUT 148.

Failure to adhere to both of these rules can compromise calibration integrity, resulting in unwanted quantization anomalies such as contouring. For example, it may appear that equivalent results could be obtained by simply using a calibration LUT in place of copy of tone correction LUT 148' for performing calibration and then using simple inversion to transform data values after applying defect compensation, with any two inverse LUTs in place of inverse tone correction processing LUT 841 and tone correction LUT 148. Using such a scheme would be equivalent to following rule (b) above, but violating rule (a) and would have the same inherent drawbacks as were described hereinabove with reference to FIG. 2.

Example Three

The following example illustrates how unwanted shifting of data values can occur if both rules (a) and (b) are not followed. For example, consider again an input image data 100 value of 131. At copy of tone correction LUT 148', this data value would be converted, by a non-linear mapping, to an integer value (again, in the 0-1215 range) of 594. A pixel requiring no defect correction from defect correction processing block 120 then yields the tone and defect corrected image data 107 value of 594. Supposing, as was shown in EXAMPLE ONE, that inverse tone correction processing LUT 841 and tone correction LUT 148 provide a linear conversion and its inverse (following rule (b) above, but violating rule (a)), an error shift is introduced. At inverse tone correction processing LUT 841, the tone and defect corrected image data 107 value of 594 undergoes the first linear transform, as follows:

255−(255/1215)*594=130

Already, a first shift occurs: image data 100 value of 131 is now shifted to the ASIC input data 109 value of 130. Then, tone correction LUT 148 performs its transform, as follows:

1215−(1215/255)*130=596

This represents a second shifting: the tone and defect corrected image data 107 value of 594 has been shifted to 596 by the transformation and inverse performed by inverse tone correction processing LUT 841 and tone correction LUT 148.

From this example, it can be seen that when both rules (a) and (b) are not followed, unwanted shifting of the data values can easily occur, compromising the integrity of calibration and, potentially, causing contouring or other imaging anomalies.

Among its advantages, the processing sequence of FIG. 4 provides the following:
  (i) defect correction applied to tone corrected image data 103, so that calibration has already been applied to image data 100 before defect correction;
  (ii) defect correction applied in a higher bit space than is used for imaging.

Following the method of the present invention, as shown in FIG. 4, defect correction is, therefore, performed within the image data as calibrated. It has been found that using the sequence of FIG. 4 provides a uniform output image that is well corrected for both low- and high-frequency artifacts. In the iterative calibration process, the sequence of FIG. 4 allows each successive calibration operation to improve over its preceding operation, allowing calibration for a printing apparatus to be completed within a reasonably small number of iterations.

Figure 5A:
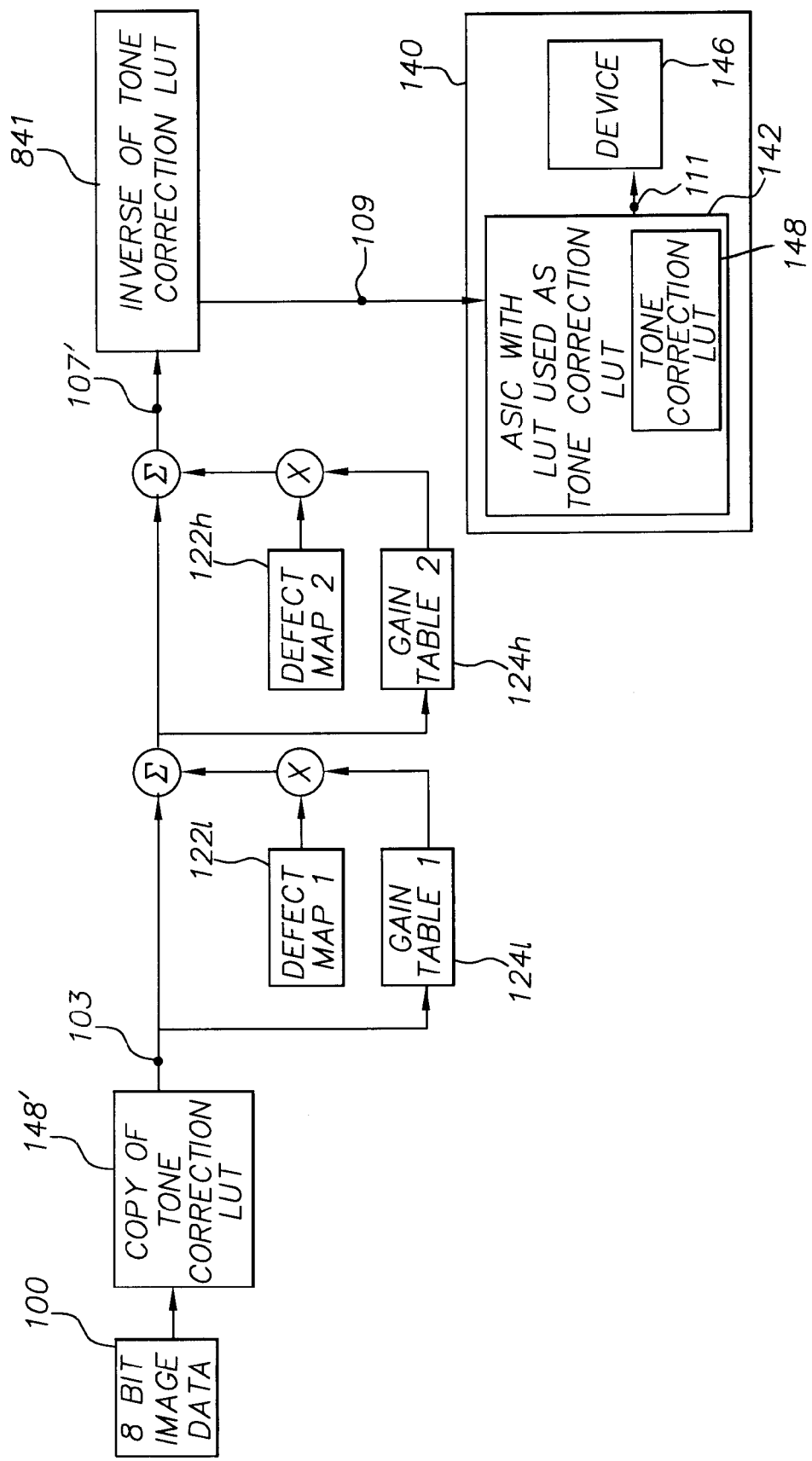
FIG. 5a is a flow diagram showing processing of image data with cascaded low- and high-frequency defect correction according to the present invention.

In some cases, different types of defect compensation may be applied in series for different types of defects, such as for low- and high-frequency defects. Spatial defects that appear only once per image can be considered as low frequency defects. Spatial defects that repeat, appearing multiple times per image, can be considered as high frequency defects. Referring to FIG. 5a, there is shown a modification of the processing sequence of FIG. 4 for cascaded defect correction. A low frequency defect map 122*l* and its accompanying low frequency gain table 124*l* are first applied to tone corrected image data 103. Then, a high frequency defect map 122*h* and its accompanying high frequency gain table 124*h* are applied to provide tone and defect corrected image data 107'. Inverse tone correction processing LUT 841 then converts tone and defect corrected image data 107' down to the bit space used for image modulation assembly 140 to provide ASIC input data 109. Processing through tone correction 148 then provides conditioned input data 111 which is input to spatial light modulator 146 for forming an image.

Figure 5B:
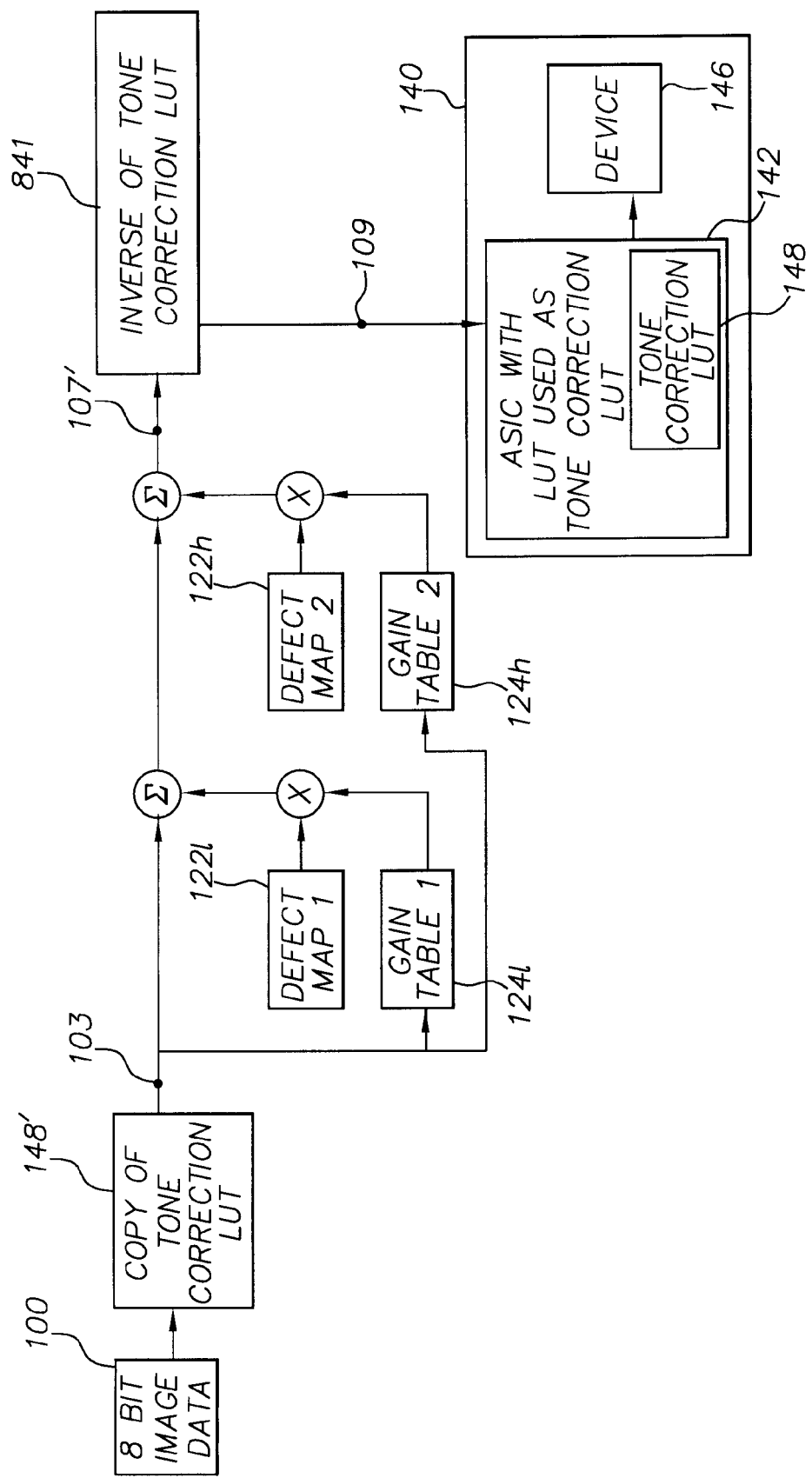
FIG. 5b is a flow diagram showing processing of image data with cascaded low- and high-frequency defect correction according to another embodiment of the present invention.

Referring to FIG. 5b, there is shown an alternative cascading arrangement to that of FIG. 5a, in which tone corrected image data 103 is processed through low and high frequency gain tables 124*l* and 124*h* in a slightly different sequence. In the sequence of FIG. 5b, the same tone corrected image data 103 value goes to both low frequency gain table 124*l* and high frequency gain table 124*h*, then to the respective low and high frequency defect maps 122*l* and 122*h* so that the combined low- and high-frequency defect compensation offsets are summed to condition tone and defect corrected image data 107'.

Sequence for Generating Tone Correction LUT 148

Figure 6:
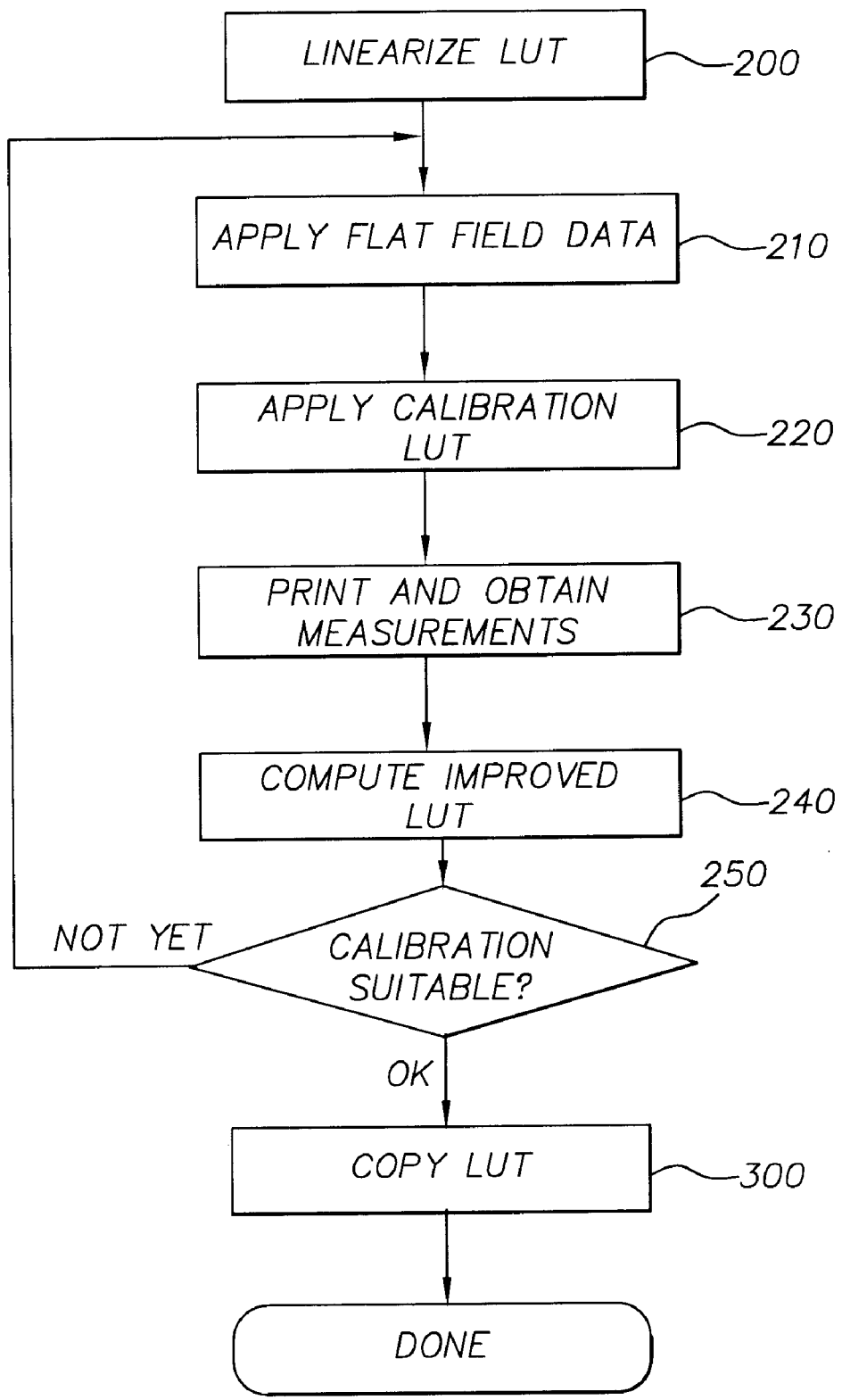
FIG. 6 is a flowchart showing the iterative process for generating a calibration tone correction LUT.

Referring to the flowchart of FIG. 6, there is shown the basic sequence of steps used for generating tone correction LUT 148 in calibration. At the outset of calibration, LUT 148 is linearized in a LUT linearization step 200, so that LUT 148 initially does not affect the image data. In a grayscale data step 210, flat field calibration input data is generated for processing and printing. In a LUT application step 220 flat field calibration input data is processed through LUT 148. In the initial iteration, this processing does not change the input data. On second and third iterations, LUT 148 begins to affect the input data in a sequence of successively improved approximations. In a printing and measurement step 230, a calibration print is generated and sensitometric data is measured. In an LUT computation step 240, tone correction LUT 148 is generated. In a decision step 250, the acceptability of the calibration print determines whether or not a next iteration is needed. If it is necessary for another iteration, processing loops back to grayscale data step 210. If calibration is acceptable, LUT 148 is copied to LUT 148' in a copy step 300.

Repeated looping through the flow chart procedures of FIG. 6 yields tone correction LUT 148 suitable for calibration of an imaging apparatus. Defect map 122 and gain table 124 are computed as described in the commonly-assigned U.S. patent application Ser. Nos. 09/606,891, 09/712,641, and 10/360,030, as was noted above.

The method of the present invention is particularly effective when used with LCD areas spatial light modulators, of both reflective and transmissive types. In addition, the present invention can be employed with other types of area spatial light modulators, such as digital micromirror devices (DMDs), for example. While the method of the present invention has shown utility in a printing apparatus, this same method could be used for imaging applications in general, including display applications.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, defect maps can be cascaded in any order to provide defect correction for the spatial light modulator device. Processing computations can be performed on ASIC 142 or on any suitable memory device for controlling the imaging operation of spatial light modulator 146.

Thus, what is provided is a method for applying defect correction that is substantially independent of imaging device calibration.

What is claimed is:

1. A method for applying defect correction and calibration to an image data value for a pixel in an imaging system using an area spatial light modulator that accepts image data values having a first bit depth, the method comprising:
   (a) providing the image data value to a first tone correction LUT to obtain a corresponding tone corrected data value, said tone corrected data value having said first bit depth;
   (b) applying, to said tone corrected data value, a defect compensating value from a defect map generated for the area spatial light modulator and a gain value associated with said defect compensating value, forming thereby a first tone and defect corrected image data value having said first bit depth;
   (c) applying an inverse tone correction LUT to convert said first tone and defect corrected image data value to a second tone and defect corrected image data value having a second bit depth, said second bit depth being lower than said first bit depth; and
   (d) providing said second tone and defect corrected image data value to a second tone correction LUT to obtain a conditioned input data value for the area spatial light modulator, said conditioned input data value having said first bit depth.

2. A method for applying defect correction and calibration to an image data value according to claim 1 wherein said inverse tone correction LUT is an inverse of said second tone correction LUT.

3. A method for applying defect correction and calibration to an image data value according to claim 1 wherein the step of applying said defect compensating value comprises the step of adding a null value, so that said tone corrected data value equals said first tone and defect corrected image data value.

4. A method for applying defect correction and calibration to an image data value according to claim 1 wherein said area spatial light modulator is taken from the group consisting of transmissive LCD, reflective LCD, and digital micromirror devices.

5. A method for applying defect correction and calibration to an image data value according to claim 1 wherein said second tone correction LUT is a duplicate of said first tone correction LUT.

6. A method for applying defect correction and calibration to an image data value according to claim 1 wherein said first tone correction LUT is generated by obtaining at least one sensitometric measurement from a calibration print and by processing said at least one sensitometric measurement through a tone correction algorithm.

7. A method for applying defect correction and calibration to an image data value in an imaging system using an area spatial light modulator, the method comprising:

(a) mapping said image data value to a first tone correction value to obtain a tone corrected image data value;

(b) conditioning said tone corrected image data value using a first defect compensating value generated for the area spatial light modulator and a first gain value associated with said first defect compensating value to obtain a first defect compensated value;

(c) conditioning said first defect compensated value using a second defect compensating value generated for the area spatial light modulator and a second gain value associated with said second defect compensating value to obtain a second defect compensated value;

(d) mapping said second defect compensated value to an inverse tone correction value to obtain a first conditioned input data value thereby;

(e) mapping said first conditioned input data value to a second tone correction value to obtain a second conditioned input data value thereby;

(f) providing said second conditioned input data value to the spatial light modulator for imaging; and wherein said inverse tone correction value is an inverse of said second tone correction value.

8. A method for applying defect correction and calibration to an image data value according to claim 7 wherein said first tone correction value is generated by obtaining at least one sensitometric measurement from a calibration print and by processing said at least one sensitometric measurement through a tone correction algorithm.

9. A method for applying defect correction and calibration to an image data value according to claim 7 wherein said first defect compensating value compensates for a spatially distributed defect, wherein said spatially distributed defect occurs at least twice within an image.

10. A method for applying defect correction and calibration to an image data value according to claim 7 wherein the step of applying said first defect compensating value comprises the step of adding a null value, so that said tone corrected image data value equals said first defect compensated value.

11. A method for applying defect correction and calibration to an image data value according to claim 7 wherein said area spatial light modulator is taken from the group consisting of transmissive LCD, reflective LCD, and digital micromirror devices.

12. A method for applying defect correction and calibration to an image data value in an imaging system using an area spatial light modulator, the method comprising:

(a) applying a tone correction value to the image data value to provide a tone corrected image data value, said tone correction value generated by obtaining at least one sensitometric measurement from a calibration print and by processing said at least one sensitometric measurement through a tone correction algorithm;

(b) conditioning said tone corrected image data value using a first defect compensating value generated for the area spatial light modulator and a first gain value associated with said first defect compensating value to obtain a first defect compensated value;

(c) conditioning said tone corrected image data value using a second defect compensating value generated for the area spatial light modulator and a second gain value associated with said second defect compensating value to obtain a second defect compensated value;

(d) combining said first and said second defect compensated values to obtain a combined defect compensated value;

(e) applying an inverse tone correction value to said combined defect compensated value to obtain a conditioned input data value thereby; and (f) providing said conditioned input data value to the area spatial light modulator for imaging.

13. A method for applying defect correction and calibration to an image data value according to claim 12 wherein said first defect compensating value compensates for a spatially distributed defect, wherein said spatially distributed defect occurs at least twice within an image.

14. A method for applying defect correction and calibration to an image data value according to claim 12 wherein the step of conditioning said tone corrected image data value using a first defect compensating value comprises the step of adding a null value, so that said first defect compensated value equals said tone corrected image data value.

15. A method for applying defect correction and calibration to an image data value according to claim 12 wherein the step of conditioning said tone corrected image data value using a second defect compensating value comprises the step of adding a null value, so that said second defect compensated value equals said tone corrected image data value.

16. A method for applying defect correction and calibration to an image data value according to claim 12 wherein said area spatial light modulator is taken from the group consisting of transmissive LCD, reflective LCD, and digital micromirror devices.

* * * * *